United States Patent Office 2,766,247
Patented Oct. 9, 1956

---

2,766,247

ACYCLIC, POLYNITRILE-CONTAINING, UNSATURATED COMPOUNDS AND PREPARATION THEREOF

William Joseph Middleton, Wilmington, Del., assignor to E. I. du Pont de Nemours and Company, Wilmington, Del., a corporation of Delaware No Drawing. Application April 15, 1955,
Serial No. 501,712

14 Claims. (Cl. 260—286)

This invention is concerned with a class of acyclic, polynitrile-containing, unsaturated compounds which are strong, water-soluble, monohydric organic acids and their salts, and methods for preparing these compounds; and is more particularly concerned with the class, all of which are monohydric acids consisting of 1,1,3,3-tetracyanopropene substituted in the 2-position with alkoxy, 2-hydroxyalkoxy, 3-hydroxyalkoxy, or their sulfur analogs, salts of this class of acids, and preparation of the acids and their salts.

In my copending application, Serial No. 501,711, filed on the same day as the present application, it is shown that a dicyanoketene acetal will react with two molecular equivalents of sodiomalononitrile to give the 1,3 - sodium salt of 2 - dicyanomethylene - 1,1,3,3 - tetracyanopropane. The dihydric acid obtained from this salt is a surprisingly strong organic acid, having a strength similar to that of strong mineral acids. The unusual strength of this acid might be supposed to be due to the fact that, aside from the two replaceable hydrogens, it is composed entirely of carbon and nitrogen with three highly unsaturated groups attached to each acidic carbon atom. However, this does not fully account for the unusual strength of the acid because these structural characteristics are also true of the monohydric acid, 1,1,2,3,3-pentacyanopropene, disclosed in my copending application, Serial No. 501,713, filed on the same day as the present application. This latter compound is a strong acid, but does not approach the strength of the first ionizable hydrogen of the above dihydric acid. A monohydric organic acid of this type which has the strength of a strong mineral acid should be a valuable improvement.

It is an object of this invention to provide a class of monohydric organic acids which have structural similarities to the dihydric acids referred to above and have strengths similar to that of the strong mineral acids. Another object is to provide salts of these acids. A further object is to provide methods for preparing the acids and their salts. Other objects will become apparent from the specification and claims.

In accordance with this invention, it has been found that a dicyanoketene acetal or thioacetal reacts with one molecular equivalent of sodiomalononitrile to form compounds of the formula

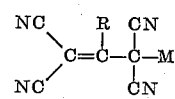

where R is alkoxy, 2-hydroxyalkoxy, 3-hydroxyalkoxy, alkylmercapto, 2-mercaptoalkylmercapto, or 3-mercaptoalkylmercapto, and M is hydrogen, an inorganic cation, an amine cation or a sulfonium cation.

This reaction yields the 2-alkoxy-[including 2-(2-hydroxyalkoxy)- and 2-(3-hydroxyalkoxy)-] 1,1,3,3-tetracyanopropenes and their sulfur analogs initially in the form of a sodium salt from which the free acid may be regenerated by treating an aqueous solution with an anion which removes the metal cation as an insoluble compound, as by passing the solution through an acidic ion-exchange resin. Other salts of the acid may be prepared by neutralizing a solution of the free acid with a suitable base or by metathesis of a salt of the acid with a salt of the desired cation, preferably in aqueous solution.

When the dicyanoketene acetal employed is a dialkyl acetal (or thioacetal), a 2-alkoxy-1,1,3,3-tetracyanopropene (or 2-alkylthio-1,1,3,3-tetracyanopropene) and an alcohol (or thiol) is obtained. When a dicyanoketene cyclic acetal (a 2-dicyanomethylene-1,3-dioxolane or a 2-dicyanomethylene-1,3-dioxane or sulfur analogs thereof) is employed, a 2-(2-hydroxyalkoxy)- or a 2-(3-hydroxyalkoxy)-1,1,3,3-tetracyanopropene or sulfur analog thereof is obtained.

For convenience in naming the compounds of the present invention, the monovalent anion formed by removal of the proton from the 1-position of a 2-alkoxy-1,1,3,3-tetracyano-2-propene is referred to as the corresponding 2-alkoxy-1,1,3,3-tetracyanopropenide ion.

Dicyanoketene acetals for use in this invention may be prepared by the reaction of tetracyanoethylene with alcohols in the presence of a catalyst, such as urea, a tertiary amine or a salt of a metal. When the alcohol employed is a 1,2- or 1,3-glycol, the corresponding dicyanoketene cyclic acetal (i. e., 2-dicyanomethylene-1,3-dioxolane or 2-dicyanomethylene-1,3-dioxane) is obtained. The preparation of dicyanoketene thioacetals from carbon disulfide and malononitrile is disclosed by Edwards and Kendall in U. S. Patent No. 2,533,233.

In the following examples, which illustrate embodiments of the invention but are not to be construed as limitative, parts are by weight.

EXAMPLE I

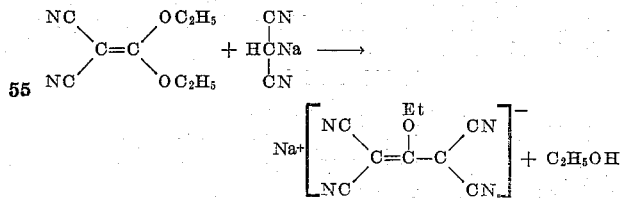

Dicyanoketene diethyl acetal, 554 parts, is added to a solution prepared by dissolving 77 parts of sodium in 3,946 parts of absolute ethyl alcohol and adding 220 parts of malononitrile. As the solid dissolves, the solution becomes warm. The white precipitate which forms upon cooling is collected on a filter, washed with ether and recrystallized from alcohol. There is obtained 450 parts of sodium 2-ethoxy-1,1,3,3-tetracyanopropenide in the form of white needles, melting above 300° C.

*Analysis.*—Calcd. for $C_9H_5N_4ONa$: C, 51.93; H, 2.42; N, 26.92; Na, 11.05. Found: C, 52.24; H, 2.50; N, 27.02, 27.14; Na, 11.00.

EXAMPLE II

A solution of 50 parts of sodium 2-ethoxy-1,1,3,3-tetracyanopropenide in 500 parts of water is passed through an acidic ion-exchange resin ("Amberlite IR-120-H") followed by an after-wash of water. There is obtained 1,000 parts of an aqueous solution of the free acid, 2-ethoxy-1,1,3,3-tetracyanopropene. This solution is strongly acidic, having an acid strength comparable to a corresponding concentration of one of the mineral acids, such as hydrochloric acid.

When a portion of the aqueous solution of 2-ethoxy-1,1,3,3-tetracyanopropene is evaporated under vacuum at room temperature, a polymeric product is obtained in the form of an orange-red gum.

EXAMPLE III

A solution of 680 parts of dicyanoketene ethylene acetal (2 - dicyanomethylene - 1,3 - dioxolane) in 1,973 parts of hot ethyl alcohol is mixed with an alcoholic solution of sodiomalononitrile prepared from 330 parts of malononitrile and 115 parts of sodium in 1,973 parts of ethyl alcohol. An exothermic reaction ensues and the reaction mixture is cooled in ice. A white precipitate forms as the reaction mixture is cooled. The precipitate is collected on a filter, washed with cold alcohol, and recrystallized from alcohol. There is obtained 850 parts of sodium 2-(2-hydroxyethoxyl)-1,1,3,3-tetracyanopropenide in the form of white needles, M. P. ca. 300° C. with decomposition.

*Analysis.*—Calcd. for $C_9H_5N_4O_2Na$: C, 48.22; H, 2.25; N, 25.00; Na, 10.26. Found: C, 48.61, 48.64; H, 2.53, 2.43; N, 25.00, 24.91; Na, 10.08.

EXAMPLE IV

An aqueous solution of sodium 2 - ethoxy - 1,1,3,3-tetracyanopropenide, prepared as in Example I, is mixed with an aqueous solution of a molecular excess of N-methylquinolinium iodide. The precipitate which forms is collected on a filter, washed with water, and recrystallized from water. N - Methylquinolinium 2 - ethoxy-1,1,3,3-tetracyanopropenide is obtained as long, light yellow needles, M. P. 131-132° C.

*Analysis.*—Calcd. for $C_{19}H_{15}NO$: C, 69.28; H, 4.59; N, 21.27. Found: C, 69.22; H, 4.59; N, 21.40, 21.43.

EXAMPLE V

Sodium 2-ethoxy-1,1,3,3-tetracyanopropenide is reacted in water with tetraethylammonium bromide to give a white crystalline solid. Recrystallization of this product from hot water yields tetraethylammonium 2-ethoxy-1,1,3,3-tetracyanopropenide in the form of white needles melting at 63-64° C.

*Analysis.*—Calcd. for $C_{17}H_{25}N_5O$: C, 64.70; H, 7.95; N, 22.20. Found: C, 64.63, 64.59; H, 8.20, 7.81; N, 22.30, 22.26.

EXAMPLE VI

A hot solution of 90 parts of sodium 2-ethoxy-1,1,3,3-tetracyanopropenide in 500 parts of water is added with stirring to a hot solution of 45 parts of cobaltous sulfate in 250 parts of water. An orange precipitate (12 parts) forms. This material is recrystallized from water to yield orange crystals of cobaltous 2 - ethoxy-1,1,3,3-tetracyanopropenide dihydrate.

*Analysis.*—Calcd. for $CoC_{18}H_{10}N_8O_2 \cdot 2H_2O$: Co, 12.85; C, 46.50; H, 3.01; N, 24.00. Found: Co, 12.82, 12.80; C, 46.84, 46.78; H, 3.11, 3.10; N, 24.05, 24.10.

When an equivalent amount of silver nitrate is used in place of cobaltous sulfate in the process of this example, silver 2-ethoxy-1,1,3,3-tetracyanopropenide is obtained.

EXAMPLE VII

A hot solution of 104 parts of sodium 2-ethoxy-1,1,3,3-tetracyanopropenide in 500 parts of water is added with stirring to a hot solution of 62.5 parts of cupric sulfate ($CuSO_4 \cdot 5H_2O$) in 300 parts of water. On cooling, the reaction mixture deposits red-brown crystals, which are recrystallized from water to yield 60 parts (53.5% yield) of red-brown crystals of cupric 2-ethoxy-1,1,3,3-tetracyanopropenide with 2-½ moles of water of hydration.

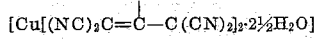

*Analysis.*—Calcd. for $CuC_{18}H_{10}N_8O_2 \cdot 2\frac{1}{2}H_2O$: Cu, 13.3; C, 45.2; H, 3.15; N, 23.45. Found: Cu, 13.15, 13.22; C, 45.61, 45.87; H, 3.19, 3.13; N, 23.49, 23.23.

This product is useful as a pigment. Cupric 2-ethoxy-1,1,3,3-tetracyanopropenide may be dispersed in any conventional coating composition vehicle in the preparation of an enamel, printing ink or the like. Suitable vehicles include linseed oil, alkyd resin solutions and solutions of nitrocellulose. For example, when the pigment is dispersed in an alkyd resin solution it forms a yellow enamel. A film of this enamel, brushed on a wooden substrate and air dried, is tack-free and hard and has a soft yellow color with high hiding power.

EXAMPLE VIII

A hot solution of 104 parts of sodium 2-ethoxy-1,1,3,3-tetracyanopropenide is added with stirring to a hot solution of 68 parts of nickelous sulfate in 300 parts of water. On standing, the reaction mixture deposits 100 parts of nickelous 2 - ethoxy - 1,1,3,3 - tetracyanopropenide trihydrate

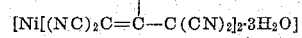

in the form of a light blue crystalline solid.

*Analysis.*—Calcd. for $NiC_{18}H_{10}N_8O_2 \cdot 3H_2O$: Ni, 12.2; C, 46.7; H, 3.31; N, 23.4. Found: Ni, 18.2, 18.6; C, 46.75, 46.62; H, 3.06, 3.12; N, 24.05, 24.13.

When sodium 2-(2-hydroxyethoxy)-1,1,3,3-tetracyanopropenide is used in place of sodium 2-ethoxy-1,1,3,3-tetracyanopropenide in the process of this example, nickelous 2-(2-hydroxyethoxy)-1,1,3,3-tetracyanopropenide is obtained.

EXAMPLE IX

A solution of 90 parts of sodium 2-(2-hydroxyethoxy)-1,1,3,3-tetracyanopropenide (prepared as in Example III) in 500 parts of water is mixed with a solution of 56 parts of cobaltous sulfate in 500 parts of water and the solution stored at 5° C. After standing for one week, there is obtained as an orange precipitate 70 parts of cobaltous 2-(2-hydroxyethoxy)-1,1,3,3-tetracyanopropenide tetrahydrate which is recrystallized from 250 parts of water.

*Analysis.*—Calcd. for $CoC_{18}H_{10}N_8O_2 \cdot 4H_2O$: Co, 11.8; C, 43.10 H, 3.59; N, 22.40. Found: Co, 14.10; C, 43.18, 43.48; H, 2.78, 2.97; N, 21.17, 21.06.

When an equivalent amount of silver nitrate is used in place of cobaltous sulfate in the process of this example, silver 2-(2-hydroxyethoxy)-1,1,3,3-tetracyanopropenide is obtained.

When the dicyanoketene acetals indicated in Table I are substituted for dicyanoketene diethyl acetal in the process of Example I, a solution of the indicated sodium 2-alkoxy-1,1,3,3-tetracyanopropenide is obtained. The free acid is obtained by passing this solution through an acidic ion-exchange resin as in Example II.

Table I

| Dicyanoketene Acetal | Sodium Salt | Free Acid |
|---|---|---|
| NC\\C=C/O—CH₃ ; NC/ ...\\O—CH₃ <br> dicyanoketene dimethyl acetal | Na⁺ [NC\\C=C/O—CH₃ —C(CN)₂]⁻ <br> sodium 2-methoxy-1,1,3,3-tetracyanopropenide | NC\\C=C(O—CH₃)—CH(CN)₂ <br> 2-methoxy-1,1,3,3-tetracyanopropene |
| NC\\C=C/O—C₁₈H₃₇ ; NC/ ...\\O—C₁₈H₃₇ <br> dicyanoketene di-n-octadecyl acetal | Na⁺ [NC\\C=C/O—C₁₈H₃₇ —C(CN)₂]⁻ <br> sodium 2-n-octadecyloxy-1,1,3,3-tetracyanopropenide | NC\\C=C(O—C₁₈H₃₇)—CH(CN)₂ <br> 2-n-octadecyloxy-1,1,3,3-tetracyanopropene |
| NC\\C=C/O—CH₂—CH=CH₂ ; NC/ ...\\O—CH₂—CH=CH₂ <br> dicyanoketene diallyl acetal | Na⁺ [NC\\C=C/O—CH₂—CH=CH₂ —C(CN)₂]⁻ <br> sodium 2-allyloxy-1,1,3,3-tetracyanopropenide | NC\\C=C(O—CH₂—CH=CH₂)—CH(CN)₂ <br> 2-allyloxy-1,1,3,3-tetracyanopropene |

2-n-octadecyloxy-1,1,3,3-tetracyanopropene and its salts dissolve in gasoline and lubricating oils and are useful as stabilizers and modifiers in such compositions. Such properties are characteristic of the 2-alkoxy-1,1,3,3-tetracyanopropene compounds in which the alkyl chain is long.

When the dicyanoketene cyclic acetals indicated in Table II are substituted for dicyanoketene ethylene acetal in the process of Example III, a solution of the indicated sodium 2-hydroxyalkoxy-1,1,3,3-tetracyanopropenide is obtained. This solution is passed through an acidic ion-exchange resin as in Example II to obtain the indicated free acid.

chloride in 50 parts of water. The white precipitate which forms is collected on a filter, washed with a small amount of water, and recrystallized from alcohol-ether. There is obtained 11 parts of tetramethylammonium 2-methylmercapto-1,1,3,3-tetracyanopropenide in the form of white needles, M. P. 113–114° C.

*Analysis.*—Calcd. for $C_{12}H_{15}N_5S$: C, 55.15; H, 5.78; N, 26.80; S, 12.27. Found: C, 55.34; H, 5.82; N, 26.69, 26.44; S, 11.93.

When triethylsulfonium iodide is substituted for tetramethylammonium chloride in Example XI, triethylsulfonium 2-methylmercapto-1,1,3,3-tetracyanopropenide is obtained.

Table II

| Dicyanoketene Cyclic Acetal | Sodium Salt | Free Acid |
|---|---|---|
| 2-dicyanomethylene-1,3-dioxane | sodium 2-(3-hydroxypropoxy)-1,1,3,3-tetracyanopropenide | 2-(3-hydroxypropoxy)-1,1,3,3-tetracyanopropene |
| 2-dicyanomethylene-4,4,5,5-tetraethyl-1,3-dioxolane | sodium 2-(2,hydroxy-1,1,2-triethylbutoxy)-1,1,3,3-tetracyanopropenide | 2-(2-hydroxy-1,1,2-triethylbutoxy)-1,1,3,3-tetracyanopropene |

EXAMPLE X

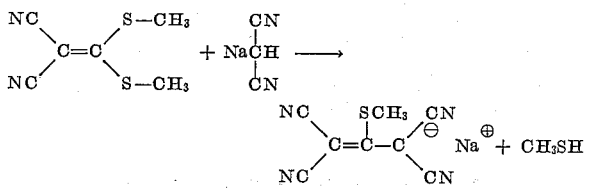

A solution of sodiomalononitrile prepared by mixing 46 parts of sodium and 132 parts of malononitrile in 3,150 parts of ethyl alcohol is mixed with a warm solution of 340 parts of dicyanoketene dimethyl thioacetal in 3,950 parts of alcohol. The solution is allowed to stand at room temperature for one hour, and then drowned in 71,350 parts of ether. There is obtained 310 parts of sodium 2-methylmercapto-1,1,3,3-tetracyanopropenide in the form of a white powder.

EXAMPLE XI

A solution of 150 parts of sodium 2-methylmercapto-1,1,3,3-tetracyanopropenide in 100 parts of water is mixed with a solution of 30 parts of tetramethylammonium

EXAMPLE XII

A solution of 15 parts of sodium 2-methylmercapto-1,1,3,3-tetracyanopropenide in 100 parts of water is mixed with a solution of 30 parts of N-methylquinolinium iodide in 250 parts of water. The light yellow solid which precipitates is collected on a filter, washed with water, and recrystallized from water. There is obtained 20 parts of N-methylquinolinium 2-methylmercapto-1,1,3,3-tetracyanopropenide in the form of long yellow needles, M. P. 133–134° C.

*Analysis.*—Calcd. for $C_{18}H_{13}N_5S$: C, 65.24; H, 3.96; N, 21.14; S, 9.67. Found: C, 64.84; H, 3.66; N, 21.17, 21.36; S, 9.58.

The reaction of dicyanoketene acetals with a single molar equivalent of sodiomalononitrile may be carried out in the presence of trace amounts of water. However, since water is not inert with respect to the reactants, the presence of large amounts of water, e. g., amounts of the order of one-half molar equivalent or more, leads to a loss of product through side reactions. It is, therefore, better to carry out the reaction in the presence of an organic liquid medium which is inert to the reactants. Suitable inert solvents for the reactants comprise the alcohols such as methanol, ethanol, the propanols, the butanols, ethylene glycol, the propylene glycols, glycerine and the like, the ethers such as dimethyl, diethyl and diisopropyl ether, dioxane and tetrahydrofuran, and liquid hydrocarbons such as pentane, hexane, cyclohexane, cyclohexene, benzene, toluene, the xylenes, and the like. Of these media, the alcohols are preferred.

The temperature at which a dicyanoketene acetal may be reacted with a single molar equivalent of sodiomalononitrile may be varied within wide limits. For example, by using a high boiling solvent or by operating in a closed system under pressure, temperatures in the range of 100° to 200° C. may be employed. Similarly, by using a medium with a low freezing point, temperatures below 0° C. may be used. However, for practical purposes, it is best to operate below the normal boiling point of the reaction medium at temperatures between 0° and 100° C., and particularly temperatures between 0° and 50° C.

The 2-alkoxy-1,1,3,3-tetracyanopropenes or their sulfur analogs may be converted to their salts by reaction with the hydroxide or carbonate of the desired cation. Thus, calcium di[2-ethoxy-1,1,3,3-tetracyanopropenide] may be obtained from the product of Example II by reaction with calcium hydroxide or calcium carbonate. Similarly, barium hydroxide or barium carbonate gives barium 2-ethoxy-1,1,3,3-tetracyanopropenide.

The barium sals of the 2-alkoxy-1,1,3,3-tetracyanopropenes or the 2-(hydroxyalkoxy)-1,1,3,3-tetracyanopropenes and their sulfur analogs are water soluble and are useful for preparing other salts of these acids by reacting with aqueous solutions of the corresponding sulfate. Barium sulfate precipitates quantitatively as a by-product and is readily filtered off, leaving an aqueous solution of a 2-alkoxy-1,1,3,3-tetracyanopropene salt of the cation which was introduced in the form of its sulfate. In this way, barium 2-alkoxy-1,1,3,3-tetracyanopropenides and barium 2-(hydroxyalkoxy)-1,1,3,3-tetracyanopropenides react with aqueous solutions of the sulfates of Al, Ce, Cs, $Cr^{++}$, $Cr^{+++}$, $Co^{++}$, $Co^{+++}$, $Cu^{++}$, $Fe^{++}$, $Fe^{+++}$, Ga, In, $Ni^{++}$, Li, K, $Mn^{++}$, Rb, $Sn^{++}$, $Sn^{++++}$, Th, $UO_2$, VO, Zn, Zr, $NH_4^+$, $C_6H_5NH_3^+$, $(C_2H_5)_2NH_2^+$, $(CH_3)_3NH^+$ and $(CH_3)_3S^+$ to yield the corresponding metal, amine or sulfonium salts of the 2-alkoxy-1,1,3,3-tetracyanopropene or 2-(hydroxyalkoxy)-1,1,3,3-tetracyanopropene and their sulfur analogs.

The salts of the 2-alkoxy-1,1,3,3-tetracyanopropenes and their sulfur analogs of this invention in which the alkyl chain contains six carbon atoms or less dissolve readily in methanol, more slowly in ethanol, acetone and tetrahydrofuran, and do not dissolve in the common hydrocarbons, halogenated hydrocarbons, ethers and dioxane.

The free acids and the salts, which are products of this invention, precipitate gelatin from aqueous solutions and are, therefore, useful as hardening agents for photographic gelatin compositions. By a similar token, these compounds are also useful as tanning agents for leather. Of particular interest are the colored salts, for example, nickelous 2-ethoxy-1,1,3,3-tetracyanopropenide, which imparts a bluish color to leather when it is used as a tanning agent.

The products of this invention are luminescent when examined under ultraviolet light. For example, sodium 2-(2-hydroxyethoxy)-1,1,3,3-tetracyanopropenide fluoresces blue under ultraviolet light (3,650 A.) and cobaltous 2-ethoxy-1,1,3,3-tetracyanopropenide dihydrate fluoresces red. The corresponding salts of 1,1,3,3-tetracyanopropene show no luminescence under ultraviolet light of this wave length.

Since many different embodiments of the invention may be made without departing from the spirit and scope thereof, it is to be understood that the invention is not limited by the specific illustrations, except to the extent defined in the following claims.

What is claimed is:
1. A compound of the formula

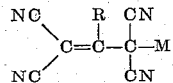

where R is selected from the group consisting of alkoxy, 2-hydroxyalkoxy, 3-hydroxyalkoxy, alkylmercapto, 2-mercaptoalkylmercapto, and 3-mercaptoalkylmercapto, and M is selected from the group consisting of hydrogen, inorganic cations, amine cations and sulfonium cations.
2. 2-alkoxy-1,1,3,3-tetracyanopropenes.
3. 2-alkylmercapto-1,1,3,3-tetracyanopropenes.
4. 2-(2-hydroxyalkoxy)-1,1,3,3-tetracyanopropenes.
5. 2-(3-hydroxyalkoxy)-1,1,3,3-tetracyanopropenes.
6. A 2-alkoxy-1,1,3,3-tetracyanopropenide salt.
7. A metal salt of a 2-alkoxy-1,1,3,3-tetracyanopropene.
8. A salt of a 2-alkoxy-1,1,3,3-tetracyanopropene and an amine.
9. The process for preparing a compound as defined in claim 1 which comprises reacting a compound from the group consisting of dicyanoketene acetals and dicyanoketene thioacetals with one molecular equivalent of sodiomalononitrile.
10. The process which comprises mixing a dicyanoketene acetal and sodiomalononitrile in an inert organic liquid medium until equal molecular equivalents have reacted to form the sodium salt of a 2-alkoxy-1,1,3,3-tetracyanopropene.
11. The process which comprises mixing a dicyanoketene acetal and sodiomalononitrile in an inert organic liquid medium until equal molecular equivalents have reacted to form a 2-alkoxy-1,1,3,3-tetracyanopropene, and isolating a 2-alkoxy-1,1,3,3-tetracyanopropenide salt thereof.
12. The process which comprises treating an aqueous solution of a metal salt of a 2-alkoxy-1,1,3,3-tetracyanopropene, formed by reacting a dicyanoketene acetal with a molecular equivalent of sodiomalononitrile, with an anion which removes the metal cation as an insoluble compound.
13. The process which comprises mixing a dicyanoketene thioacetal and sodiomalononitrile in an inert organic liquid medium until equal molecular equivalents have reacted to form the sodium salt of a 2-alkylmercapto-1,1,3,3-tetracyanopropene.
14. The process which comprises mixing a dicyanoketene thioacetal and sodiomalononitrile in an inert organic liquid medium until equal molecular equivalents have reacted to form a 2-alkylmercapto-1,1,3,3-tetracyanopropene, and isolating a 2-alkyl-mercapto-1,1,3,3-tetracyanopropenide salt thereof.

References Cited in the file of this patent
UNITED STATES PATENTS

| | | |
|---|---|---|
| 2,541,350 | Gilbert | Feb. 13, 1951 |
| 2,721,799 | Edwards et al. | Oct. 25, 1955 |

OTHER REFERENCES

Urushibara et al.; 31 C. A. 1681 (1937).